United States Patent [19]

Bergmann

[11] Patent Number: 4,804,009

[45] Date of Patent: Feb. 14, 1989

[54] PNEUMATIC INTERFACE APPARATUS FOR CONTROL OF PROCESS SYSTEMS

[75] Inventor: Mark S. Bergmann, Milwaukee, Wis.

[73] Assignee: Johnson Service Company, Milwaukee, Wis.

[21] Appl. No.: 644,148

[22] Filed: Aug. 24, 1984

Related U.S. Application Data

[63] Continuation of Ser. No. 386,408, Jun. 8, 1982, abandoned.

[51] Int. Cl.[4] .......................................... G05D 16/00
[52] U.S. Cl. ........................................ 137/84; 137/85
[58] Field of Search ................ 137/86, 84, 85, 596.17, 137/625.64, 82, 83

[56] References Cited

U.S. PATENT DOCUMENTS

| | | | |
|---|---|---|---|
| 2,775,982 | 1/1957 | Caufield | 137/625.64 |
| 2,800,913 | 7/1957 | Swartwout | 137/84 |
| 3,266,380 | 8/1966 | Eige | 137/85 X |
| 3,394,722 | 7/1968 | Stranahan | 137/84 |
| 3,556,154 | 1/1971 | Kramer | 137/625.64 |
| 3,598,138 | 8/1971 | Hadley | 137/82 |
| 3,774,641 | 11/1973 | Mindner | 137/625.64 |
| 3,874,407 | 4/1975 | Griswold | 137/596.17 |
| 4,207,914 | 6/1980 | Holloway | 137/85 |
| 4,440,066 | 4/1984 | Anderson | 91/459 |

*Primary Examiner*—Alan Cohan
*Attorney, Agent, or Firm*—Alexander M. Gerasimow; Edward L. Levine; Larry L. Shupe

[57] ABSTRACT

The incremental interface system of the present invention includes a pneumatic input means for providing a first pressure to be regulated. A pressure repeater means includes a volume relay having a first chamber coupled to the intermediate bus of the input means and a second chamber coupled to a pneumatic transducer to be controlled, the first chamber and the second chamber being in fluid flow isolation one from the other. The pressure repeater means provides a second pressure at its second chamber which has a predetermined relationship to the first pressure. A reservoir means is coupled to the intermediate bus between the input means and the repeater means for limiting the rate of change of the first pressure. The input means, repeater means and reservoir means cooperate to define a substantially constant volume of fluid. In a first preferred embodiment, the reservoir means is coupled in parallel with the first chamber while in a second preferred embodiment, the reservoir means is coupled in series with the first chamber.

9 Claims, 3 Drawing Sheets

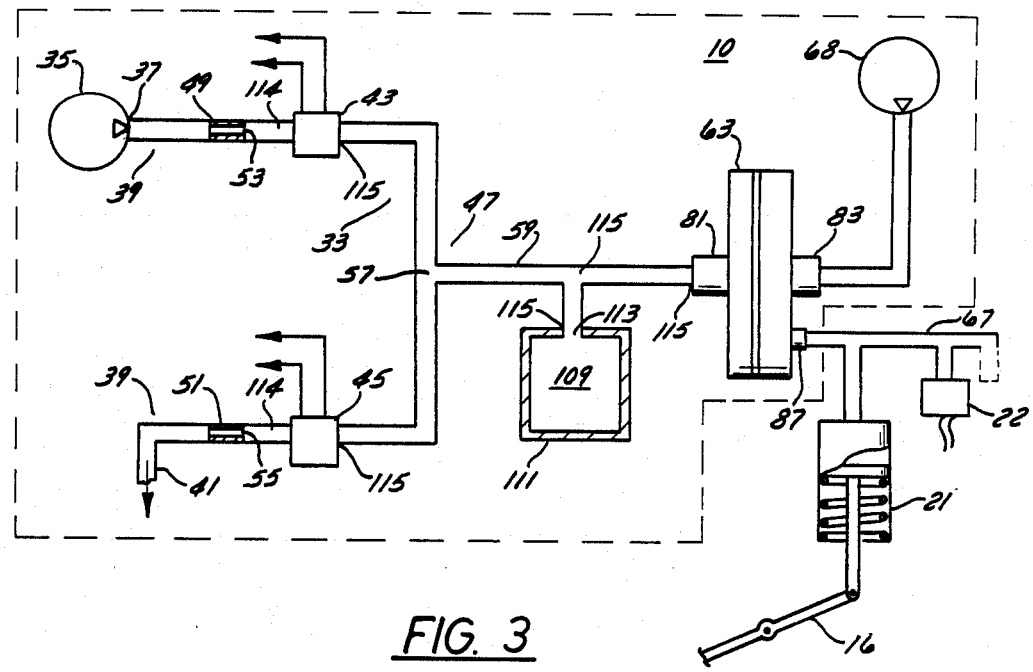

FIG. 3

$$\Delta \text{Out}(n) = \text{Out}(n) - \text{Out}(n-1)$$
$$= K_p \left( (e(n) - e(n-1)) + \frac{\Delta t}{T_I} e(n) \right.$$
$$\left. + \frac{T_D}{\Delta t}(e(n) - 2e(n-1) + e(n-2)) \right)$$

where  $K_p$ = proportional gain $T_I$ = integral (reset) time $T_D$ = derivative (rate) time $\Delta t$ = Time interval between parameter sampling times $\Delta \text{Out}(n)$ = change in output $e$ = error difference between parameter set point and the controlled variable

FIG. 6

PNEUMATIC INTERFACE APPARATUS FOR CONTROL OF PROCESS SYSTEMS

This application is a continuation of application Ser. No. 386,408, filed June 8, 1982, now abandoned.

BACKGROUND OF THE INVENTION

Pneumatic control of process systems is widely employed wherever the system installation requires rugged components, lowered cost, relative ease of installation and troubleshooting and a high degree of controllability. Examples of such processes which readily lend themselves to pneumatic control include the control of chiller and boiler temperature, steam or air line pressure control, flow control in fluid-transporting pipe systems, tank liquid level control, pH control in chemical processes, and heating, ventilating and air conditioning controls. Pneumatic control is frequently employed in petrochemical process systems where flammable fluids are often present and may be ignited by electrical control devices. For purposes of illustration, and not by way of limitation, the invention is shown and described in connection with a heating, ventilating and air conditioning system.

Heating, ventilating and air conditioning (HVAC) systems are frequently used in buildings to control the temperature of a conditioned space within the building and for energy management purposes. A type of HVAC system includes an air handling unit having a plurality of actuator-manipulated shutters and dampers for controlling the flow of outdoor air into the building, for controlling the flow of air exhausted from the building and for directing air which is heated or cooled and recirculated. Other mechanisms associated with air handling units typically include actuator-manipulated valves for controlling the flow of chilled or heated water through heat exchanger coils disposed in the ductwork for controlling the temperature of air flowing therethrough.

One type of actuator used with such air handling units is of the spring biased, pneumatic cylinder type coupled by a position control device to a source of pneumatic pressure such as a pneumatic bus network formed of small diameter flexible polyeythlene tubing and installed throughout the building. The position control device, typically a pneumatic logic panel, controls the flow of pressurized fluid from the pneumatic bus to the actuator and the flow of exhaust fluid from the actuator to the surrounding ambient for maintaining specified parameters, space temperature being exemplary. Control is by the solution of known algorithms and the generation of analog output signals directed to the actuators.

Optimally, it is desirable in any control loop to accomplish actuator movement in the shortest practical time in order to avoid the unnecessary introduction of error into the system. However, for reasons related to overall installation cost, design features are often incorporated which regulate the stroke time of an actuator. In order to control the time required to stroke an actuator over a predetermined distance and against the opposing force of its biasing spring, an inlet restrictor having an orifice of reduced diameter therethrough may be disposed in the input pneumatic lines coupled to the actuator. A second restrictor may be employed in the exhaust line between the actuator and the surrounding ambient for controlling the actuator stroking characteristics in the opposite direction.

The advent of computerized direct digital control apparatus and the desire of building owners to incorporate such computerized apparatus into new or existing HVAC systems employing low cost, rugged pneumatic actuators requires that a digital-to-pneumatic interface system be employed for receiving digital signals from the control apparatus and translating them to pneumatic signals for actuator positioning. Computerized, direct digital controllers may be constructed and arranged to repetitively solve any one or more of several known control algorithms for generating command signals to the interface system. Examples of such algorithms include the standard proportional integral (PI) and proportional integral derivative (PID) algorithms, the latter usually being presented in its position equation. This equation calculates the position of an actuator at the nth sampling time as a function of the measured error. A disadvantage of using this equation to control pneumatic actuators is that the resulting command signals from the digital controller must be converted to an absolute pneumatic pressure having a known relationship to an absolute actuator position and this signal conversion requires a relatively expensive type of transducer.

For reasons related to lower cost and optimum control, it is preferable to arrange the controller for the solution of the PID algorithm in its velocity form, sometimes called the incremental form. The solution thereof results in controller digital command signals which direct the interface system to effect a computed change in actuator pressure rather than provide a new absolute pressure. This change in pressure results in a change in actuator position, the magnitude of which is a specified percentage of its total available stroke distance. Use of the incremental form of the equation provides bumpless transfer, eliminates a phenomenon known as integral windup and requires no feedback device for continuously indicating actuator position. However, the use of the incremental form of the PID algorithm requires that the interface system provide precise actuator positioning in a manner unaffected by any change in the volume of fluid contained within that portion of the pneumatic system comprising the actuators and the bus connected directly thereto. An example of an interface system useful for controlling the position of a single actuator or for the simultaneous control of the position of several actuators of the same size, spring range and loading is shown in U.S. Pat. No. 4,261,509. This system includes a pair of two position, electrically actuated solenoid valves for receiving digital signals and controlling the flow of fluid into and out of the actuator. Pneumatic resistors, sometimes termed restrictors, having orifices therethrough typically of a few thousandths of an inch in diameter are disposed in the pneumatic lines for controlling actuator stroke distance per unit time, i.e., for controlling the slopes of the actuator pressure-time graphs representative of actuator stroke characteristics in both directions of travel.

For air handling units having a plurality of actuator-positioned dampers, shutters and valves, it is important for energy conservation reasons that those devices be properly sequenced to utilize, insofar as possible, the cooling capability of the outdoor air. For example, as the temperature in a conditioned space rises, the actuator controlling the position of a hot water valve would be positioned to move the valve to a more flow-restrictive position. If space temperature continues to rise, the hot water valve would be modulated to a closed position. Simultaneously, outdoor air, exhaust air and return air dampers would be positioned by their associated actuators to permit, respectively, the introduction of additional outdoor air into the conditioned space, the exhaustion of a similar quantity of air to the ambient and the restriction of the flow of return air moving between the outdoor air duct and the exhaust air duct. If the temperature of the outdoor air is insufficiently low to satisfy space cooling requirements and after the outdoor air damper is fully opened, the chilled water valve is modulated to a less restrictive position to result in additional cooling to the space. The importance of closely controlled sequencing of the various actuators is apparent.

One solution to the problem of actuator sequencing is to design or select actuators having spring ranges which result in sequential actuator operation, from minimum to maximum position, over a predetermined increment of pressure within the range of the available control pressure. In the aforementioned example and assuming an available control pressure range of 0–20 psig, the actuator controlling the heating coil valve may have a spring selected to permit full actuator stroking over the 3–8 psig increment, the outdoor, return and exhaust damper actuator springs selected to permit stroking over the 8–13 psig increment and the chilled water valve actuator spring selected to permit stroking over the 13–18 psig increment. If actuators having only fixed or unknown spring ranges are available, a far more typical circumstance, proper sequencing may be achieved by incorporating pilot positioners upon all valve and damper actuators. Such positioners are mechanically coupled to the associated actuator, have closed pressure chambers of known volumes and have adjustments for selecting the pressure at which spring-compressing actuator movement commences and the pressure range or span over which total actuator travel may be effected. The pilot positioner is thereby capable of positioning its associated actuator from a selectable pressure starting point and over a selectable pressure span, each of which is independent of the size, spring range of and loads on the actuator.

While interface systems of the aforementioned type have heretofore been satisfactory for the positioning of actuators they are nevertheless characterized by certain disadvantages. For example, when restrictors are used to control the stroking characteristics of a single actuator or of a group of actuators having the same size, spring range and loading, the restrictor orifice sizes must be selected by experimentation at the installation site. This is so since actuator stroke times are dependent upon actuator size, spring range, loading and the volume of fluid contained within the actuator and the pneumatic interconnections. These parameters are frequently difficult or impossible to determine prior to actual installation.

If the HVAC system requires actuator sequencing and incorporates actuators having different volumetric sizes, spring ranges and/or loadings, the system will exhibit highly nonlinear gain characteristics and the control problem is further complicated. Using the interface system of the aforementioned patent as illustrative, and assuming a plurality of parallel connected dissimilarly-configured actuators to be controlled, the percent change of position will be different for each actuator for a given time during which a solenoid is energized for introducing fluid to or expelling fluid from the actuators. This is so since a change in the contained volume of fluid of one actuator will affect the stroke distance per unit time of other actuators in accordance with the equation of state of an ideal gas. If restrictors are selected to control the stroke time of, for example, a small, lightly loaded actuator, the system response will be unacceptably sluggish for positioning larger or more heavily loaded actuators. Conversely, if restrictors are selected for the proper control of actuators of the latter type, system instabilities may result. Even with the addition of pilot positioners to some or all of the actuators, restrictor selection must be by field experimentation or by measurement and computation of the volume of compressed fluid contained within the pneumatic interconnections and the pilot positioner pressure chambers.

A further refinement of the system described above includes the addition of a constant volume reservoir coupled in parallel with the pneumatic bus to which the actuators are connected. If pilot positioners are used on all actuators and if the capacity of the reservoir is selected to confine a volume of fluid which is, for example, at least ten times that of the volume of fluid contained within the constant volume chambers of the pilot positioners and within the interconnecting pneumatic tubing, the restrictors may be preselected and the gain of the resulting system will vary less than 10%. However, 100 feet of ¼ inch OD polyethylene tubing as commonly employed in pneumatic bus networks has a contained volume of about 27 cubic inches. If this contained volume is to affect actuator stroke times by less than 10%, the confined volume of the reservoir must be greater than 270 cubic inches in order to permit preselection of the restrictor orifice sizes. A reservoir of such size is unacceptably large and, further, it may be impractical or impossible to determine the length and size of the pneumatic tubing prior to actual installation. Additionally and even though restrictors were preselected based upon the known volume of fluid confined in the pneumatic tubing and the input pressure chambers of the pilot positioners, it will be necessary to select restrictors having orifices of different sizes if the configuration of the system and therefore the total confined volume is changed by the later addition or deletion of actuators and/or tubing. Further, the aforedescribed refined system must be used with pilot positioners upon all actuators even though those actuators, because of their spring ranges, may be sequenced without them. This is so since a movement of one or more actuators will otherwise result in a change in the total volume of fluid contained within the system and a consequent change in actuator stroking characteristics.

A further disadvantage of systems of the aforementioned type is that they are susceptible to significant leaks of pneumatic fluid. For example, each pneumatic connection of ¼ inch tubing typically has a leak rate of approximately 0.1 standard cubic inches per minute (SCIM) at 20 psig while a typical pilot positioner has a leak rate of 0.3 SCIM. In a system including a constant volume reservoir where the system contains a relatively small volume of fluid and/or a large number of connection points and pilot positioners, changes in the control pressure due to leaks within the system and over the time interval between parameter sample times, e.g., conditioned-space temperature sampling times, would be unacceptably large. In accordance with the incremental form of both the PI algorithm and the PID algorithm, a change in control pressure due to leaks would result in a constant offset from the parameter set point, e.g., the desired space temperature, pre-established within the system controller data base and poor control performance will result. While the magnitude of change of the control pressure between sample times may be reduced by the selection of a reservoir having a volume sufficiently large to make the change in system pressure resulting from fluid leaks to be small, this approach similarly requires the selection of a reservoir having an unacceptably large volume and therefore physical size.

Accordingly, a interface system which permits preselection of restrictor orifice sizes irrespective of the configuration of the related pneumatic bus and actuators, which may be used to control actuators having a wide variety of contained fluid volumes and which may be used to position actuators irrespective of whether pilot positioners are used therewith would be a significant advance over the prior art.

SUMMARY OF THE INVENTION

In general, the incremental interface system of the present invention includes a pneumatic input means for providing a first pressure to be regulated. A pressure repeater means has a first chamber coupled to the input means and a second chamber coupled to a pneumatic transducer to be controlled, the first chamber and the second chamber being in fluid flow isolation one from the other. The pressure repeater means provides a second pressure at its second chamber which has a predetermined relationship to the first pressure. A reservoir means is coupled between the input means and the repeater means for limiting the rate of change of the first pressure.

In a preferred embodiment, the pneumatic input means comprises a first source of compressed fluid as, for example, a regulated air compressor coupled to the first end of a pneumatic bus, the second end of which is open for fluid exhaustion to atmosphere. A first input valve and a second exhaust valve are arranged in series along the bus in a spaced apart relationship for controlling the flow of fluid and thus the first pressure in the intermediate bus connected therebetween. The valves are of the two position, normally closed, solenoid type, thereby permitting direct digital control of valve position. A first restrictor is disposed in the bus intermediate the first fluid source and a bus connection point on the intermediate bus for controllably flowing compressed fluid into the intermediate bus upon energization of the first valve. Similarly, a second restrictor is disposed intermediate the connection point and the exhaust end of the bus for controllably flowing compressed fluid from the intermediate bus to the ambient upon actuation of the second valve.

The pressure repeater means preferably includes a second source of compressed fluid and a volume relay constructed and arranged for sensing the first pressure and responsively providing a second pressure which is applied to one or more transducers for control thereof. The volume relay is constructed and arranged such that the second pressure is maintained at a predetermined relationship to the first pressure and includes a first chamber coupled to the connection point in pressure sensing relationship thereto and a second chamber in fluid-flow isolation from the first chamber. The second chamber has connected thereto a second source of compressed fluid at a predetermined pressure and a pneumatic output bus, the latter being coupled to one or more actuators to be positioned. The volume relay is constructed and arranged such that, with increasing pressures in the intermediate bus and the first chamber as will result from actuation of the first valve, compressed fluid will be permitted to flow from the second source to establish a pressure in the second chamber, and therefore in the output bus and the actuator, which has a predetermined relationship to that of the first chamber. Decreases in pressure in the intermediate bus and first chamber resulting from actuation of the second valve will cause the volume relay to exhaust fluid from the second chamber and output bus while simultaneously inhibiting further flow from the second source, thereby maintaining the predetermined pressure relationship.

An accumulator comprising a closed reservoir is coupled in a fluid receiving relationship intermediate the pneumatic input means and the volume relay. The minimum volume of the reservoir is selected in view of several design parameters related to restrictor orifice size, the time interval between parameter sampling times, maximum permissible actuator position error and the total volume of fluid confined within the intermediate bus, the first chamber and the reservoir.

It is an object of the invention to provide a new and improved interface system for positioning pneumatic actuators which overcomes the disadvantages of the prior art.

Another object of the invention is to provide an interface system which permits the preselection of flow controlling restrictors.

Yet another object of the invention is to provide an interface system having actuator positioning characteristics independent of the size or number of actuators connected thereto.

Still another object of the present invention is to provide an interface system, the actuator-positioning accuracy of which is substantially unaffected by system fluid leaks.

Another object of the present invention is to provide an incremental interface system which is useful with direct digital controllers.

Yet another object of the present invention is to provide an interface system which limits the maximum system offset error between parameter sampling times.

Still another object of the invention is to provide an interface system useful with controllers which provide command signals based upon the solution of a proportional integral derivative algorithm in incremental form. These and other objects of the invention will become more apparent from the detailed description thereof taken with the accompanying drawing.

DESCRIPTION OF THE DRAWING

FIG. 3 is a schematic diagram of a second embodiment of the interface system of FIG. 1 with portions shown in cross-section;

FIG. 6 is the incremental form of a proportional integral derivative algorithm.

DESCRIPTION OF THE PREFERRED EMBODIMENT

Figure 1:
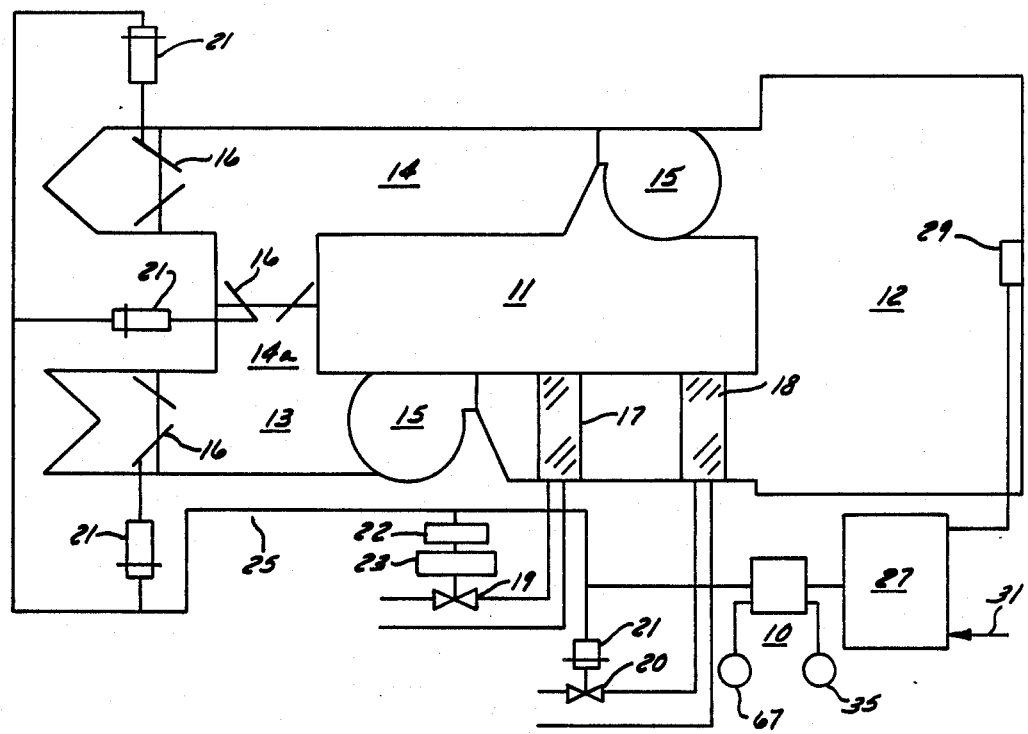
FIG. 1 is a simplified schematic diagram showing the interface system of the present invention in conjunction with an exemplary process control system comprising an air handling unit.

In FIG. 1, the interface system 10 of the present invention is shown in connection with an exemplary process control system comprising an air handling unit 11 arranged in fluid flow communication with a space 12 to be conditioned. The air handling unit 11 includes an inlet duct 13 for introducing outdoor ambient air to the space 12, an exhaust duct 14 for removing air therefrom and a cross connected return duct 14coupled between the inlet duct 13 and the exhaust duct 14. Fans 15 are provided for forced air movement. Each duct includes a movable damper 16 disposed therein for controlling the flow of air therethrough. The inlet duct 13 also includes an air cooling coil 17 having chilled water passing therethrough and an air heating coil 18 having hot water or steam passing therethrough, the coils 17, 18 being provided for controlling the temperature of air being introduced into the space 12. A chilled water valve 19 and a hot water valve 20 are coupled to the cooling coil 17 and heating coil 18 respectively for modulating the flow of liquid through the coils. The air handling unit 11 also includes pneumatic transducers for converting a pneumatic signal to another energy state as, for example, to an electrical or mechanical signal. By way of illustration, such transducers may include a plurality of pneumatic actuators 21, each actuator being mechanically coupled to its associated damper 16 or valve 20 for controllable positioning thereof. Another type of transducer may include a pneumatically actuated electrical pressure switch 22 which, when signalled by an appropriate pneumatic signal, closes its contacts for energization of an electric valve positioner 23. The transducers 21, 22 are coupled to a pneumatic bus 25 which provides a controlled pneumatic pressure for positioning the actuators 21 and the associated dampers 16 and valve 20 and for positioning a switch 22 to energize positioner 23. A direct digital system controller 27 is coupled to a parameter signalling device such as a thermostat 29 for receiving signals therefrom. The system controller 27 periodically samples a system parameter, e.g., the space temperature as signalled by the thermostat 29, compares it with the temperature set point introduced and established within its computer data base as symbolically represented by the arrow 31, digitally solves a control algorithm to provide an incremental output and generates digital electronic command signals for controlling the interface system 10 and the transducer positions. A variety of process control algorithms is available for providing incremental outputs and an example of one of the more widely used algorithms is set forth in FIG. 6. Depending upon the magnitude and polarity of any error detected between the desired parameter set point and the actual value of the parameter, e.g., between the temperature set point and the actual temperature signal as received from the thermostat 29 the interface system 10 will cause an appropriate positioning of one or more of the transducers 21, 22 in accordance with these command signals. It is to be appreciated that temperature is only one of several possible process system parameters, the control of which will be facilitated with the inventive interface system 10 and that the inventive interface system 10 is useful in systems for controlling processes wherever pneumatic transducers are employed for parameter control.

Referring next to FIGS. 1 and 3, a first embodiment of the interface system 10 is connected to an exemplary pair of pneumatic transducers, the first transducer 21 comprising a spring biased, pneumatically positioned actuator coupled to a pivotable air damper 16 for positioning control thereof. The second transducer comprises a pneumatically-actuated electrical switch 22 as may be used for positioning control of electrical valves and it should be appreciated that a typical process control system will have several transducers of a variety of types used therewith. The system 10 includes a pneumatic input means 33 having a first source of compressed fluid 35 such as an air compressor set to a regulated pressure and coupled to the first end 37 of a pneumatic bus 39, the second end 41 of which is open for free fluid exhaustion to atmosphere. While the regulated pressure may be selected in view of the ratings of the various components coupled thereto, a pressure in the range of 15-20 psig is common for process control of HVAC systems. A pair of normally closed, electrically actuated solenoid valves including a first input valve 43 and a second exhaust valve 45 are arranged in series for controlling the flow of pressurized fluid to and from an intermediate bus 47 connected therebetween. The actuating solenoids of the first valve 43 and the second valve 45 each have their electrical conductors coupled to the system controller 27 for receiving command signals therefrom. The pneumatic input means 33 also includes a plurality of restrictors, sometimes termed pneumatic resistors, including a first restrictor 49 disposed in the bus 39 adjacent the first valve 43 and a second restrictor 51 disposed in the bus 39 adjacent the second valve 45. Each restrictor has a longitudinal passage therethrough which defines a first orifice 53 and a second orifice 55 for controlling the flow of compressed fluid to and from the intermediate bus 47. Upon actuation of the first valve 43, the first restrictor 49 will permit fluid to restrictively flow from the first fluid source 35 to the intermediate bus 47 while actuation of the second valve 45 will permit fluid to be exhausted from the intermediate bus 47 through the second restrictor 51 and to atmosphere. Selective actuation of the first valve 43 or the second valve 45 thereby facilitates the regulation of a first pressure within the intermediate bus 47. When neither valve is actuated, the pressure in the intermediate bus 47 remains substantially constant for reasons set out in greater detail below. It should be appreciated that the interface system 10 of the present invention will work equally well irrespective of whether a restrictor is disposed in the bus on the upstream or the downstream side of its associated valve and the restrictor locations depicted are merely for illustration.

Figure 4:
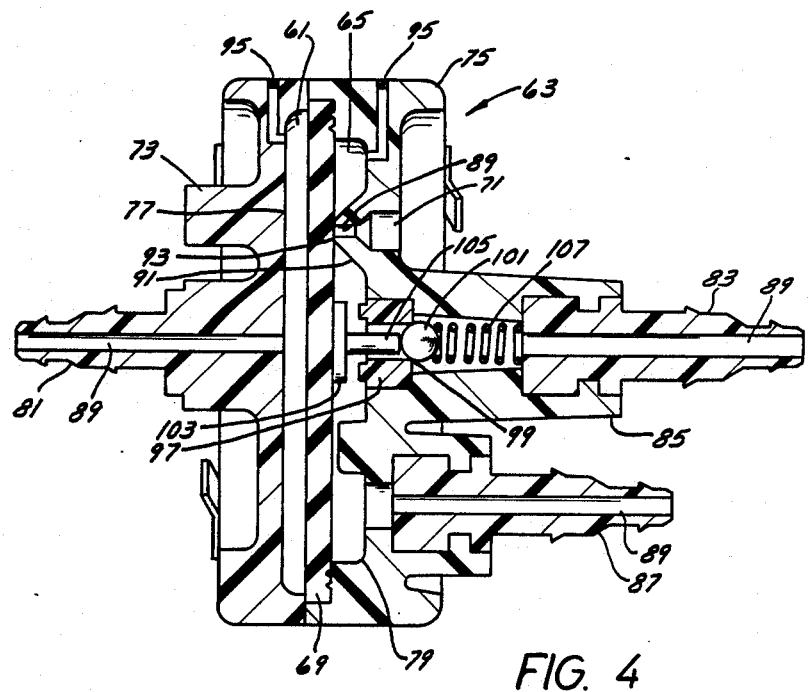
FIG. 4 is a cross-sectional view of the volume relay portion of the interface system taken in the plane 4—4 of FIG. 2.
Figure 5:
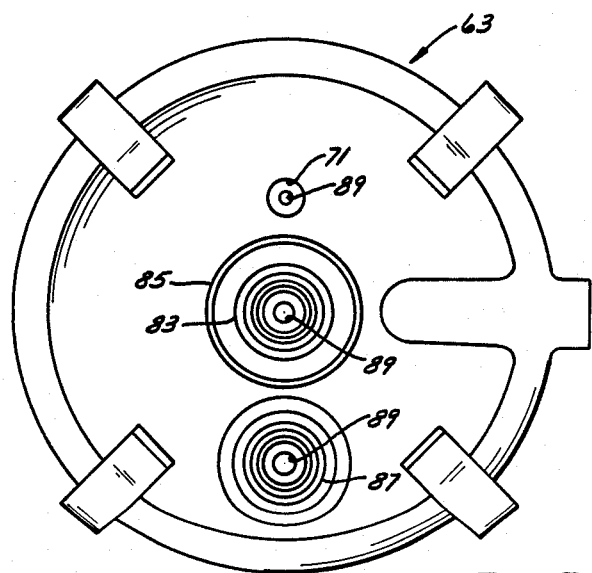
FIG. 5 is a side elevation view of the volume relay portion of the interface system taken along the direction 5—5 of FIG. 2.

Referring to FIGS. 3, 4 and 5, the intermediate bus 47 of the pneumatic input means 33 includes a connection point 57 coupled by a lateral extension 59 to the first input chamber 61 of a volume relay 63, the second output chamber 65 of which is coupled by an output bus 67 to one or more transducers to be positioned such as transducers 21, 22. A second source of compressed fluid 68 is attached to the second chamber 65 as a pneumatic driver for the transducers 21, 22. The volume relay 63 includes a resilient diaphragm 69 disposed intermediate the first chamber 61 and the second chamber 65 for maintaining the chambers 61, 65 in fluid flow isolation one from the other. An exhaust port 71 is in fluid communication with the second chamber 65 for permitting the expulsion of compressed fluid from the chamber 65, the output bus 67 and the transducers 21, 22 connected thereto. The volume relay 63 is constructed and arranged such that the pressure in the second output chamber 65, and therefore in the output bus 67 and the transducers 21, 22, will have a predetermined relationship to the pressure in the first input chamber 61, irrespective of changes in the latter. One type of volume relay useful in the present invention is shown and described in U.S. Pat. No. 4,207,914.

More particularly and referring to FIGS. 4 and 5, the volume relay 63 is shown to include first and second, rigid, generally circular housing members 73, 75 respectively, each housing member having an inwardly opposed, indented face portion 77 and 79 respectively. A pressure responsive, disc shaped diaphragm 69 formed of a resilient, planar material is disposed between the face portions 77,79 of the housings 73, 75 for defining a first input chamber 61 and second output chamber 65 in fluid flow isolation one from the other. The first housing member 73 includes a concentric, first barbed connection nipple 81 for attachment of the connection point 57 to the first chamber 61 by the lateral extension 59. The second housing member 75 includes a concentric, second barbed connection nipple 83 received within a neck portion 85 and a radially spaced, third barbed connection nipple 87 for coupling the second fluid source 68 and the output bus 67, respectively, to the second chamber 65. Each of the nipples 81, 83, 87 has a longitudinal passage 89 for permitting the flow of compressed fluid therethrough. The exhaust port 71 is formed within the second housing 75 for defining a fluid expulsion passage between the output chamber 65 and a zone at a pressure lower than that of the second fluid source 68, preferably the surrounding atmospheric ambient, and includes a longitudinal interior passage 89 concentrically formed in a shoulder member 91. The exterior surface of the shoulder member 91 defines a truncated cone having a planar nose portion 93 disposed parallel to the flat surface of the diaphragm 69 for intermittent sealing engagement therewith. Each of the housing members 73, 75 may be provided with a hypodermic test port 95 for simplified pressure sampling during installation and troubleshooting.

A check valve 97 having a circular seating edge 99 and a check ball 101 in spring loaded engagement with the seating edge 99 is concentrically disposed in the neck portion 85 of the second housing member 75. The check valve 97 selectively modulates the flow of compressed fluid from the second source 68 to the output chamber 65 and thence to the output bus 67 and the transducers 21, 22. A plunger member 103 is attached to that side of the diaphragm 69 adjacent the output chamber 65 and includes an end portion 105 for controllably unseating the check ball 101.

The volume relay 63 is preferably constructed and arranged such that the pressure in the output chamber 65 is maintained at a predetermined relationship to that of the input chamber 61. For reasons of simplicity of relay construction and ease of installation, testing and troubleshooting, it is preferred that this relationship be linear and in the ratio of 1:1.

The diameter of the check ball 101, the axial position and diameter of the seating edge 99 and the length of the end portion 105 are selected so that when the pressures in the first chamber 61 and the second chamber 65 are in equilibrium, the ball 101 is urged by its spring 107 to be in sealing engagement with the seating edge 99 and the end portion 105 of the plunger member 103 is in contact with the ball 101. Similarly, the length of the truncated cone-shaped shoulder member 91 is selected to be such that, under conditions of chamber pressure equilibrium as described, the cone nose portion 93 is in sealing engagement with the planar face of the diaphragm 69. It is to be noted that while the flexure of diaphragm 69 will result in slight momentary changes in the volume of fluid defined by the first chamber 61, such changes are quite small and will have no significant effect upon the performance of the interface system 10.

A closed reservoir 109 is coupled to the lateral extension 59 in fluid flowing communication therewith and in parallel with the input chamber 61 of the volume relay 63 for limiting the rate of change of pressure in the intermediate bus 47 and the input chamber 61. While an appropriate reservoir may be formed by a length of coiled tubing closed at one end or by an enlarged intermediate bus section or volume relay input chamber, a satisfactory reservoir is formed by a cylindrical, rigid-walled canister 111 having an aperture 113 permitting connection of the reservoir to the lateral extension.

Figure 2:
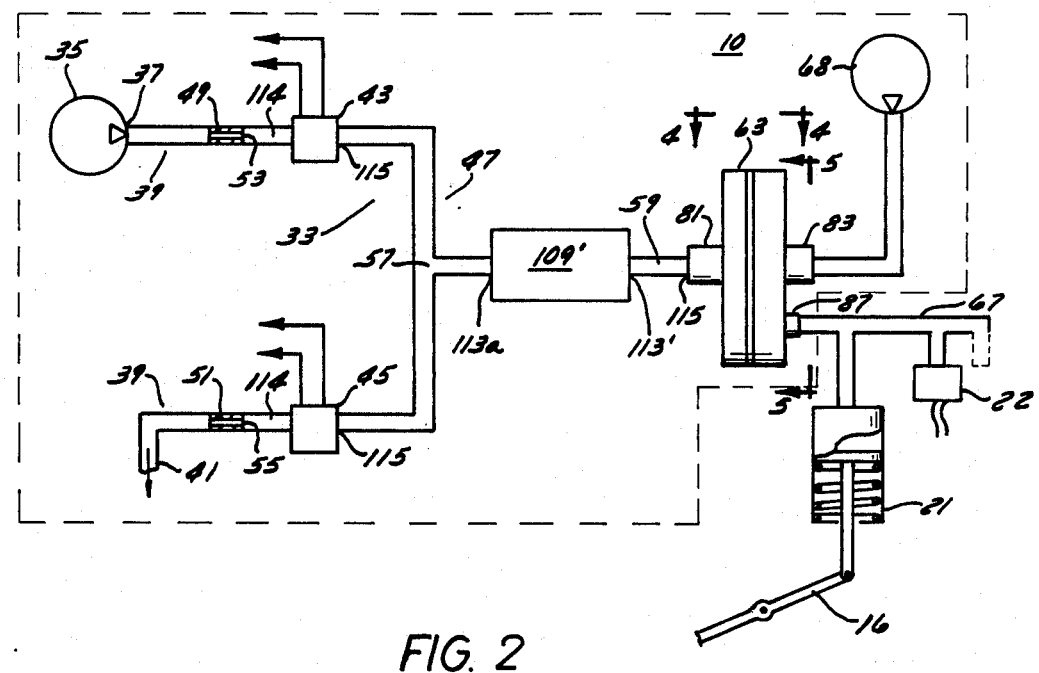
FIG. 2 is a schematic diagram of a first embodiment of the interface system of FIG. 1 with portions shown in cross-section.

A second embodiment of the interface system 10 is shown in FIG. 2 and differs from the first embodiment only in that the reservoir 109' is connected in fluid flowing communication with the lateral extension 59 of the intermediate bus 47 and in series with the input chamber 61 of the volume relay 63. An appropriate reservoir 109' would therefore include a pair of connection apertures 113', 113a for appropriate coupling. While the pressure propagation dampening characteristics and somewhat lower cost of the embodiment of FIG. 3 may be desirable for some applications, that of FIG. 2 is more satisfactory for avoiding slight and momentary delays in pressure propagation and selection is a matter of design choice.

It should be understood that the interface system embodiments of FIGS. 2 and 3 may be readily configured using available tubing, connector, restrictor, valve, volume relay and reservoir components. However, where higher production quantities warrant, the components may be packaged into a single structure having fluid-conductive passages and a reservoir of enlarged volume etched or otherwise formed therewithin. While tooling and design investment will necessarily be increased with this approach, assembly costs will be materially lowered.

When selecting the volumetric size of the reservoir 109 or 109', it is preferred that consideration be given to several design parameters selected in view of the equation of state of an ideal gas, $pV=nRT$, where $p$=pressure, $V$=volume, $n$=number of moles of the gas, $R$=universal gas constant and $T$=temperature. One such parameter is the magnitude of the operative volume of compressed fluid defined within a portion of the interface system 10 and which is maintained constant. The operative volume is that total volume of compressed fluid confined within the intermediate bus 47 including its lateral extension 59, the reservoir 109 or 109' and the input chamber 61 taken together with the volume of any parasitic fluid. Parasitic fluid is that which resides in those portions 114 of the intermediate bus 47 between a restrictor 49 or 51 and its associated solenoid valve 43 or 45, respectively. If the valves 43, 45 are constructed with resistors incorporated therein, this parasitic volume may be practically eliminated.

Another design parameter to be considered is that each of the orifices 53, 55 in the restrictors 49, 51 will have a practical minimum diameter, typically on the order of 0.005 thousandths of an inch, in order to avoid orifice plugging by small particles entrained in the fluid and in order to permit manufacture of the restrictors 49, 51 by conventional techniques. Yet another parameter to be recognized when selecting the reservoir 109 or 109' is the leakage rate, if any, of the pneumatic connection points 57, 115 between the intermediate bus 47 and its lateral extension 59, the valves 43, 45, the volume relay input chamber 61 and the reservoir itself. This leakage rate may be limited to a very low value or eliminated entirely by potting the interface system 10 with a fluid-impervious compound after assembly. Still another parameter to be recognized in selecting the size of the reservoir 109 or 109' is the desired slopes of the pressure change-time curves which will result upon actuation of either of the valves 43, 45 and as determined by the regulated setpoint of the first pressure source 35 and the size of the orifices 53, 55 of the restrictors 49, 51.

In the case of an interface system 10 having connection points 57, 115 characterized by small but detectable leaks, the minimum size of the reservoir 109 or 109' should preferably be that which will result in a pressure change in the volume of fluid contained within the interface system 10 of less than about 1% over the maximum time interval during which the system 10 will be maintained in a quiescent state when neither the valve 43 nor the valve 45 is actuated. This will normally be the maximum time interval between those consecutive times when the system controller 27 will sample a parameter, e.g., a temperature signal, and generate corrective commands. For optimum transducer positioning accuracy over extended periods of operation, it is preferred that this pressure change be limited to one-half of 1% or less. If the interface system 10 is potted to eliminate connection leaks altogether, the controlling parameter for the selection of the minimum volumetric reservoir size becomes the desired maximum slopes of the pressure response-time curves computed in view of the aforementioned equation and the minimum orifice sizes available or desirable to be used. It is to be appreciated that the slope of the pressure response-time curve for increasing pressures within the interface system 10 may be adjusted to coincide with or be different from that slope for decreasing pressures since the size of the orifices 53 and 55 may be independently selected.

From the foregoing, it is apparent that the interface system 10, when constructed as shown and described, has confined within its intermediate bus 47, the input chamber 61 and the reservoir 109 or 109' a volume V of compressed fluid which is substantially constant and which therefore lends itself to the application of known formulae. From the ideal gas equation and for a gas system of a given confined volume V, the introduction or exhaustion of n moles of gas to or from the volume V will result in a different gas pressure p within that volume. It is further apparent that one may control the increment of pressure change for a given exchange of n moles by manipulation of the magnitude of the confined volume V by selecting the size of the reservoir 109 or 109' in view of the number and size of pneumatic connections within the interface system 10, the resulting leakage rate, if any, of these connections and the maximum anticipated time between parameter samplings. Given an appropriate volume V, one may preselect the sizes of the orifices 53, 55 to provide the desired curve slopes for increasing and decreasing pressures within the interface system 10.

In one embodiment of the invention, short lengths of tubing having an internal diameter of 0.0625 inches and a total confined volume of about 0.08 cubic inches were used to connect the solenoid valves 43, 45, a volume relay 63 having an input chamber 61 volume of about 0.13 cubic inches and a reservoir 109, all as configured in accordance with FIG. 2. Further, the parasitic volumes of compressed fluid totaled approximately 0.006 cubic inches. For a first pressure source 35 regulated to a pressure of 20 psig, a first restrictor orifice 53 adjusted to a computed diameter of 0.00422 inches and a second restrictor orifice 55 adjusted to a computed diameter of 0.00485 inches, the volume of the reservoir 109 was selected to be 2.4 cubic inches and provided highly acceptable system accuracy for temperature sampling times spaced approximately three minutes apart.

In operation, the digital system controller 27 samples a signal representing a parameter to be controlled such as the signal from the thermostat 29 representing actual space temperature, compares it with the desired data base temperature set point, solves a predetermined algorithm and generates a digital command signal for actuating either the first valve 43 or the second valve 45. Upon opening the first valve 43, compressed fluid will flow from the first source 35 through the first restrictor 49 and the pressure within the interface bus 47, its lateral extension 59, the input chamber 61 and reservoir 109 will rise at a rate determined by the parameters selected as described above. During those periods when the pressure in the input chamber 61 is equal to or in excess of the pressure in the output chamber 65, the diaphragm 69 is maintained in sealing engagement with the planar nose portion 93, thereby preventing the escape of compressed fluid from the output chamber 65. Since the pressure in the first chamber 61 will exceed that in the second chamber 65, the diaphragm 69 is caused to flex rightwardly as seen in FIG. 4. The plunger end portion 105 bearing against the check ball 101 will cause a movement of the ball 101 away from sealing edge 99 and a consequent opening of the check valve 97, the area of the opening being generally proportional to the degree of diaphragm flexure. Compressed fluid from the second source 68 will thereby be permitted to flow through the check valve 97 to the output chamber 65, the output bus 67 and the transducers 21, 22 until the pressures in the output chamber 65 and the input chamber 61 are equalized, the diaphragm 69 is returned to position equilibrium and the check ball 101 is returned to sealing engagement with edge 99. Any leakage of compressed fluid from the output bus connections will be sensed by the volume relay 63 which will function as described above to maintain pressure equilibrium.

Similarly, as the second valve 45 is actuated, compressed fluid in the intermediate bus 47, its lateral extension 59, the input chamber 61 and the reservoir 109 will be controllably exhausted through the second restrictor 51 to atmospheric ambient. The pressure in the interface system 10 will therefore decline at a predetermined rate and the resulting difference in pressure between the output chamber 65 and the input chamber 61 will result in flexure of the diaphragm 69 to the left as viewed in FIG. 4. Diaphragm movement will permit the passage 89 to be opened and compressed fluid in the output chamber 65, the output bus 67 and the transducers 21, 22 to be controllably exhausted from the exhaust port 71 to again bring the pressures of the input chamber 61 and the output chamber 65 into equilibrium, whereupon the diaphragm 69 again moves to a sealing engagement with the planar nose portion 93.

The minimum volumetric fluid delivery capacity of the second source 68 and the fluid flow rate capacities of the check valve 97, the exhaust port 71, the nipple passages 89 and the output bus 67 may be determined in a known manner. If those elements are sized as to result in a time lag between pressure changes at the input chamber 61 and those at the output chamber 65 and output bus 67, a corrective factor may be introduced into the computer programming of the controller 27 to compensate therefor. However, in a preferred embodiment, those delivery and flow rate capacities are selected such that the pressure in the output chamber 65 and the output bus 67 coincides with that of the input chamber 61 with no appreciable time delay therebetween. Further, it is preferred that the regulated pressure of the second source 68 be closely matched to that of the first source 35 and precise matching and construction economies will result where the second source 68 comprises an appropriately sized pneumatic bus coupled to the first source 35. If this construction is employed, it is apparent that the delivery rate of the first source 35 must be sufficient to accommodate the requirements of the interface system 10, the output bus 67 and the transducers 21, 22.

After the reservoir 109 or 109' and the sizes of the restrictor orifices 53, 55 have been pre-selected as described above, actuator positioning by start point and span and actuator or other transducer sequencing, with or without the aid of pilot positioners, may be accomplished using known techniques. It should be appreciated, however, that the response characteristics of the interface system 10 will be unaffected by the length of tubing used to connect the transducers 21, 22 to the volume relay 63 or by the functioning of the transducers 21, 22 themselves.

While only a few embodiments of the invention have been illustrated and described, it is not intended to be limited thereby but only by the scope of the appended claims.

I claim:

1. An open loop pneumatic interface apparatus for converting digital electrical input signals to a pneumatic output signal in a heating, ventilating and air conditioning system and including:

pneumatic input means adapted to be connected to a first source of compressed gas at a substantially constant pressure, said first source being connectable at a single point of said input means, said input means including normally closed first and second solenoid valves, said valves being adapted to receive pulsed electrical input signals from a direct digital system controller, said first valve being energizable for flowing compressed gas from said first source to a reservoir, said second valve being energizable for flowing compressed gas from said reservoir to an area of ambient pressure;

a pressure repeater including an input section comprising a first chamber coupled to said input means and an output section comprising a second chamber adapted to be coupled to a second source of compressed gas at a substantially constant pressure and to a pneumatic transducer to be controlled, said first chamber and said second chamber being in fluid flow isolation one from the other, said repeater providing an analog output pressure signal at said second chamber which has a noninverted magnitude that is in a predetermined ratio to the magnitude of said first pressure signal, said ratio being a function of the configuration of said repeater;

a reservoir coupled between said input means and said repeater for controlling the rate of change of said analog output pressure signal resulting from the energization of one of said valves; said input means, said first chamber and said reservoir Cooperating to define a predetermined substantially constant volume of fluid, thereby resulting in changes in said analog output pressure signal having a magnitude which is solely a function of the duration of energization of one of said solenoid valves;

said apparatus thereby being operable by said digital system controller to positionably control said transducer.

2. The invention set forth in claim 1 wherein said input means includes said first solenoid valve and a first restrictor cooperating therewith for the selective introduction of a restricted flow of compressed gas into said reservoir and said input means further includes said second solenoid valve and a second restrictor cooperating therewith for said selective exhaustion of said gas from said reservoir to an area of ambient pressure.

3. An open loop pneumatic interface apparatus for controlling the position of a plurality of pneumatic cylinders within a heating, ventilating and air conditioning system and including:

pneumatic input means including a first source of compressed gas at a substantially constant pressure and coupled to a single point of said input means which further includes normally closed first and second solenoid valves adapted to be electrically energized by a direct digital system controller, said first source defining a common supply and input source, said first valve being energizable for flowing compressed gas from said first source to a reservoir, said second valve being energizable for flowing compressed gas from said reservoir to an area of ambient pressure;

a pressure repeater for providing an analog output pressure, said repeater including a first chamber coupled to said input means and a second chamber adapted to be coupled to a pneumatic cylinder to be positionably controlled, said first chamber and said second chamber being in fluid flow isolation one from the other, said repeater providing a second pressure signal at said second chamber which has a magnitude substantially identical to the magnitude of a first pressure signal at said input means;

a reservoir coupled between said input means and said repeater means for controlling the rate of change of said first pressure signal upon energization of said first valve or said second valve;

said second chamber being coupled to a second source of compressed gas at a substantially constant pressure, said input means, said first chamber and said reservoir cooperating to define a predetermined, substantially constant volume of fluid, thereby resulting in changes in the position of said cylinder which are solely a function of the time of energization of one of said solenoid valves.

4. The invention set forth in claim 3 wherein the pressure of said first source of compressed gas and the pressure of said second source of compressed gas are substantially equal one to the other.

5. An apparatus for providing a pneumatic interface function between a digital controller in a heating and ventilating system and a pneumatic transducer for positioning a mechanical element of said system, said apparatus including:

a pneumatic device having a first chamber and a second chamber maintained in gas flow isolation one from the other by a diaphragm, said second chamber being adapted to be connected to said transducer and to an actuating source of air at a substantially constant pressure;

means for confining a predetermined volume of air, said means being coupled to said first chamber in a pneumatic pressure transmitting relationship to said diaphragm;

a first solenoid valve adapted to be electrically coupled to said controller, said first solenoid valve being further adapted to be pneumatically connected in an air flow controlling relationship between a substantially constant input source of air and said confining means, said first solenoid valve being operable to increase the pressure in said volume when energized by said controller, and;

a second solenoid valve adapted to be electrically coupled to said controller, said second solenoid valve being further adapted to be pneumatically connected in an air flow controlling relationship between said confining means and an area of ambient pressure, said second solenoid valve being operable to decrease the pressure in said volume when energized by said controller.

6. The invention set forth in claim 5 wherein the air pressure in said predetermined volume of air is solely a function of the duration of energization of said first or said second solenoid valve.

7. The invention set forth in claim 5 wherein the instantaneous air pressure in said predetermined volume at any time is a function of the aggregate times of energization of said first and second solenoid valves.

8. The invention set forth in claim 5 wherein said means for confining a predetermined volume of air includes pneumatic conductors interconnecting said solenoid valves and said first chamber.

9. The invention set forth in claim 8 wherein said means further includes an air reservoir connected to said conductors.

* * * * *